United States Patent
Lin et al.

(10) Patent No.: US 9,726,930 B2
(45) Date of Patent: Aug. 8, 2017

(54) BACKLIGHT MODULE WITH TWO SETS OF LEDS, LIQUID CRYSTAL DISPLAY AND CONTROL METHOD FOR DRIVING THE BACKLIGHT MODULE

(71) Applicants: BOE TECHNOLOGY GROUP CO., LTD., Beijing (CN); BEIJING BOE DISPLAY TECHNOLOGY CO., LTD., Beijing (CN)

(72) Inventors: Lifeng Lin, Beijing (CN); Hongming Zhan, Beijing (CN); Yongcan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 42 days.

(21) Appl. No.: 14/371,352

(22) PCT Filed: Jun. 18, 2013

(86) PCT No.: PCT/CN2013/077423
§ 371 (c)(1),
(2) Date: Jul. 9, 2014

(87) PCT Pub. No.: WO2014/153856
PCT Pub. Date: Oct. 2, 2014

(65) Prior Publication Data
US 2015/0146135 A1 May 28, 2015

(30) Foreign Application Priority Data
Mar. 29, 2013 (CN) .......................... 2013 1 0109390

(51) Int. Cl.
*G02F 1/133* (2006.01)
*H05B 33/08* (2006.01)
(Continued)

(52) U.S. Cl.
CPC ..... *G02F 1/133603* (2013.01); *G02B 6/0026* (2013.01); *G02F 1/133606* (2013.01);
(Continued)

(58) Field of Classification Search
CPC ......... G02F 1/133603; G02F 1/133606; G02F 1/133621; G02F 1/133611;
(Continued)

(56) References Cited

U.S. PATENT DOCUMENTS

2006/0221044 A1* 10/2006 Negley ................ G09G 3/3413
345/102
2010/0177534 A1 7/2010 Ryu et al.
(Continued)

FOREIGN PATENT DOCUMENTS

| CN | 1936416 A | 3/2007 |
| CN | 101151576 A | 3/2008 |
| CN | 101226305 A | 7/2008 |
| CN | 101672443 A | 3/2010 |

(Continued)

OTHER PUBLICATIONS

Translation of CN102853283.*
(Continued)

*Primary Examiner* — Lisa Landis

(57) ABSTRACT

A backlight module, a liquid crystal display and a control method for driving the backlight source, the backlight module comprising an LED backlight source and a driving circuit, the LED backlight source comprising first LEDs each formed of a blue light chip, red phosphor powder and green phosphor powder, and second LEDs each formed of a blue light chip, a green light chip and red phosphor powder, and the driving circuit comprising driving circuit modules for driving the first LEDs and the second LEDs respectively. The liquid crystal display includes the above-mentioned backlight module and the display panel.

8 Claims, 1 Drawing Sheet

(51) Int. Cl.
  *G02F 1/1335* (2006.01)
  *F21V 8/00* (2006.01)
(52) U.S. Cl.
  CPC .. *G02F 1/133609* (2013.01); *G02F 1/133611* (2013.01); *G02F 1/133621* (2013.01); *G02B 6/0023* (2013.01); *G02F 2001/133612* (2013.01); *G02F 2001/133614* (2013.01); *H05B 33/0857* (2013.01)
(58) Field of Classification Search
  CPC ... G02F 1/133609; G02F 2001/133614; G02F 2001/133612; G02B 6/0026; G02B 6/0023; H05B 33/0857; F21K 9/56
  USPC .......................................................... 345/102
  See application file for complete search history.

(56) References Cited

U.S. PATENT DOCUMENTS

| | | | |
|---|---|---|---|
| 2011/0026242 A1* | 2/2011 | Ryu | G02B 6/0051 362/97.1 |
| 2012/0087108 A1 | 4/2012 | Ke et al. | |

FOREIGN PATENT DOCUMENTS

| | | | |
|---|---|---|---|
| CN | 101876409 A | | 11/2010 |
| CN | 101937911 A | | 1/2011 |
| CN | 101994959 A | | 3/2011 |
| CN | 102036435 A | | 4/2011 |
| CN | 102853283 A | * | 1/2013 |
| CN | 102853283 A | | 1/2013 |

OTHER PUBLICATIONS

First Office Action from the State Intellectual Property Office of the People's Republic of China in Chinese patent application No. CN201310109390.1, rendered Nov. 19, 2014; 6 pages.
English translation of First Office Action from the State Intellectual Property Office of the People's Republic of China in Chinese patent application No. CN201310109390.1, rendered Nov. 19, 2014; 4 pages.
Second Office Action from the State Intellectual Property Office of the People's Republic of China in Chinese patent application No. CN201310109390.1, rendered Mar. 18, 2015; 6 pages.
English translation of Second Office Action from the State Intellectual Property Office of the People's Republic of China in Chinese patent application No. CN201310109390.1, rendered Mar. 18, 2015; 5 pages.
English Abstract of CN101151576A (listed above under Foreign Patent Documents); 1 page.
English Abstract of CN102853283A (listed above under Foreign Patent Documents); 1 page.
English Abstract of CN1936416A (listed above under Foreign Patent Documents); 1 page.
English Abstract of CN101876409A (listed above under Foreign Patent Documents); 1 page.
English Abstract of CN102036435A (listed above under Foreign Patent Documents); 1 page.
English Abstract of CN101994959A (listed above under Foreign Patent Documents); 1 page.
PCT Written Opinion (Chinese language) for international application No. PCT/CN2013/077423, dated Jan. 9, 2014; 4 pages.
English translation of PCT Written Opinion for international application No. PCT/CN2013/077423, dated Jan. 9, 2014; 5 pages.
English Abstract of CN101672443A (listed above under Foreign Patent Documents); 2 pages.
English Abstract of CN101226305A (listed above under Foreign Patent Documents); 2 pages.
English Abstract of CN101937911A (listed above under Foreign Patent Documents); 2 pages.

* cited by examiner

BACKLIGHT MODULE WITH TWO SETS OF LEDS, LIQUID CRYSTAL DISPLAY AND CONTROL METHOD FOR DRIVING THE BACKLIGHT MODULE

CROSS REFERENCE TO RELATED APPLICATIONS

This application is based on International Application No. PCT/CN2013/077423 filed on Jun. 18, 2013, which claims priority to Chinese National Application No. 201310109390.1 filed on Mar. 29, 2013. The entire contents of each and every foregoing application are incorporated herein by reference.

TECHNICAL FIELD

Embodiments of the present invention relate to a backlight module, a liquid crystal display and a control method for driving a backlight source.

BACKGROUND

A traditional liquid crystal display comprises a display panel and a backlight module including a backlight source and a control system. At present, backlight sources are generally white LED backlight sources. White light LEDs can be mainly classified into types of Bchip+Y powder (blue light chip+yellow phosphor powder) LEDs, Bchip+Y σ powder (blue light chip+red and yellow phosphor powder) LEDs, Bchip+RG powder (blue light chip+red and green phosphor powder) LEDs, BGchip+R powder (blue and green light chips+red phosphor powder) LEDs, and RGBchip (red, green and blue light chips) LEDs, for which color representation capabilities increase in order.

In the industry, the color representation capability specifications for liquid crystal displays are classified into the following from low to high: NTSC (National Television Standards Committee) below 72%; NTSC 72%, sRGB 100% matching rate (standard Red Green Blue 100% matching rate, hereinafter sRGB 100%), and Adobe 100% matching rate (hereinafter Adobe 100%).

sRGB 100% and Adobe 100% are both high-end product requirements with the standard chromaticity coordinates of red primary color, green primary color and blue primary color as shown in the following Table 1; red primary color and blue primary color have the same specification under the two standards while green primary color has different specifications; green primary color applying Adobe specification has wider color gamut range than that applying sRGB specification, and the color representation capability for sRGB specification can only correspond to 74.1% of Adobe specification.

TABLE 1

|  | Adobe standard | | sRGB standard | |
| --- | --- | --- | --- | --- |
| Chromaticity coordinates | x | y | x | y |
| Red primary colorR (Red) | 0.640 | 0.330 | 0.640 | 0.330 |
| Green primary colorG (Green) | 0.210 | 0.710 | 0.300 | 0.600 |
| Blue primary colorB (Blue) | 0.150 | 0.060 | 0.150 | 0.060 |
| NTSC Gamut | 95.5% | | 70.8% | |
| Adobe100% Matching Rate | 100% | | 74.1% | |
| sRGB100% Matching Rate | 100% | | 100% | |

NTSC Gamut refers to the ratio of the area of a triangle formed by chromaticity coordinates (x, y) of RGB of a practical product to the area of a triangle formed by chromaticity coordinates (x, y) of standard RGB primary colors of NTSC; the sRGB 100% matching rate refers to the ratio of the overlapping area between a triangle formed by chromaticity coordinates (x, y) of RGB of a practical product and a triangle formed by standard RGB chromaticity coordinates (x, y) of sRGB to the area of a triangle formed by chromaticity coordinates (x, y) of standard RGB primary colors of sRGB; and Adobe 100% Matching Rate is the ratio of the overlapping area between a triangle formed by chromaticity coordinates (x, y) of RGB of a practical product and a triangle formed by standard RGB chromaticity coordinates (x, y) of Adobe to the area of a triangle formed by chromaticity coordinates (x, y) of standard RGB primary colors of Adobe.

A color is represented by chroma and brightness together. Chroma is used to evaluate color quality stimulation with a value expressed by chromaticity coordinates generally. Brightness refers to the bright degree of a picture with a unit of candela per square meter (cd/m2) or nits. x, y in Table 1 represent chromaticity coordinates respectively; and in the table, chromaticity coordinates of red primary color (Red), green primary color (Green) and blue primary color (Blue) corresponding to Adobe specification and sRGB specification are given, and color representation capabilities corresponding to Adobe specification and sRGB specification conditions are given as well.

sRGB 100% can be realized with Bchip+RG powder LEDs, but the matching rate of Adobe 100% is much less than 100%. It is a main method for realizing Adobe 100% to replace Bchip+RG powder LEDs with GBchip+R powder LEDs. However under the same power consumption, the overall light efficiency for GBchip+R powder LEDs is low; its light flux will be decreased by more than a half with comparison to Bchip+RG powder LEDs. Although color filters with GBchip+R powder LEDs have a transmittance increased by about 8% than color filters with Bchip+RG powder LEDs, the overall brightness of the liquid crystal displays has still about loss over 46%.

SUMMARY

An embodiment of the present invention provides a backlight module comprising an LED backlight source and a driving circuit, the LED backlight source comprising first LEDs each formed of a blue light chip, red phosphor powder and green phosphor powder, and second LEDs each formed of a blue light chip, a green light chip and red phosphor powder, and the driving circuit comprising driving circuit modules for driving the first LEDs and the second LEDs respectively.

Furthermore, the backlight module may further include a light-guiding plate, and the first LEDs and the second LEDs are arranged alternately in strips on a light incidence side of the light-guiding plate.

Furthermore, the backlight module may further include a diffuser plate, and the first LEDs and the second LEDs are arranged alternately in a matrix on a light incidence side of the diffuser plate.

An embodiment of the present invention further provides a liquid crystal display including a backlight module and a display panel wherein the backlight module is the above-mentioned backlight module.

Furthermore, a frame scanning frequency of the display panel is at least 120 scans per second.

An embodiment of the present invention further provides a control method for driving backlight source used in the above-mentioned liquid crystal display, including the following steps of: turning on only the first LEDs when display colors of the liquid crystal display is in sRGB color gamut;

alternately turning on the first LEDs and the second LEDs when the display color of the liquid crystal display is beyond the sRGB color gamut.

Furthermore, the first LEDs and the second LEDs are alternately turned on when display colors of the liquid crystal display is beyond sRGB color gamut and a time period for turning on the first LEDs or the second LEDs every time is a time period for the display panel to display one frame.

Furthermore, when the display colors of the liquid crystal display are beyond sRGB color gamut, the second LEDs are turned on during the display panel displays odd numbered frames, and the first LEDs are turned on during even numbered frames.

Furthermore, when the colors to be displayed by the liquid crystal display are beyond sRGB color gamut, the second LEDs are turned on during the display panel displays odd numbered frames, and the first LEDs are turned on during even numbered frames.

DETAIL DESCRIPTION

Specific implementations of the present invention will be described in more detail below with respect to embodiments. The following embodiments are used for explaining the present invention rather than limiting the scope of the present invention.

Figure 1:
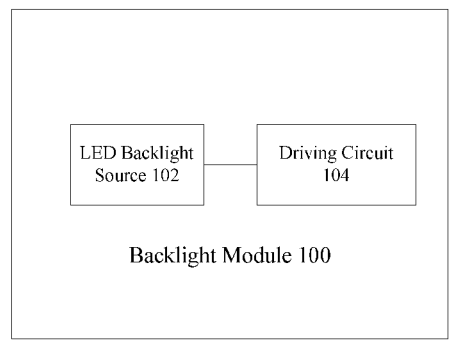
FIG. 1 is a schematic diagram of a backlight module provided by an embodiment of the present invention.

An embodiment of the present invention provides a backlight module 100 including an LED backlight source 102 and a driving circuit 104, as shown in FIG. 1. The LED backlight source includes a first LED formed by a blue light chip and red phosphor powder and green phosphor powder (hereinafter Bchip+RG powder LED), and a second LED formed by a blue light chip, a green light chip and red phosphor powder (hereinafter BGchip+R powder LED). The driving circuit includes driving circuit modules for driving the two LEDs.

Since there are provided two LEDs, namely Bchip+RG powder LED and BGchip+R powder LED, by adjusting their arrangement and number, wider color gamut can be realized with respect to sRGB specification, and brightness after light mixing will not be influenced.

Figure 2:
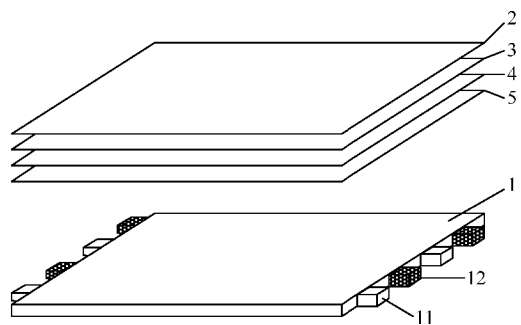
FIG. 2 is a schematic diagram of a light-guiding plate with two sets of LEDs arranged thereon.

Specifically, the backlight module further includes a light-guiding plate 200, and the Bchip+RG powder LEDs 202 and BGchip+R powder LEDs 204 are arranged in lines spaced apart from each other on the light incidence side of the guiding plate, as shown in FIG. 2. The structure of the backlight module described in the embodiment is for a side-illumination backlight module in which the light incidence surface of the light-guiding plate comprises one or two sides of the light-guiding plate and a plurality of LEDs form LED strips (lines) on the side of the light incidence surface of the light-guiding plate. In order to realize uniform mixing of light from the two kinds of LEDs, the LED strips may be arranged alternately. Of course, for other arrangements, such as one BGchip+R powder LED for every two or more Bchip+RG powder LEDs, or one Bchip+R powder LED for every two or more BGchip+R powder LEDs, the numbers of two kinds of LEDs may or may not be equal, which will not be limited in the present invention.

Figure 3:
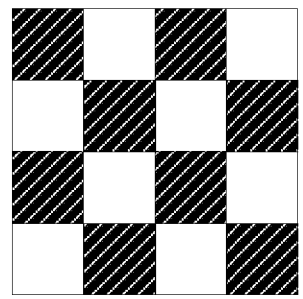
FIG. 3 is a schematic diagram of an arrangement of two kinds of LEDs.

Specifically, the backlight module further includes a diffuser plate, and the Bchip+RG powder LEDs and BGchip+R powder LEDs are arranged alternately in a matrix on the light incidence side of the diffuser plate. The backlight module in this embodiment is a direct-illumination backlight module with the bottom surface of the diffuser plate serving as a light incidence surface and the upper surface as an exiting surface. On the incidence side of the diffuser plate, namely underneath the diffuser plate, two kinds of LEDs are arranged that may be arranged alternately in a matrix to realize uniform light mixing, as shown in FIG. 3. The alternate arrangement refers to a pattern similar to a chessboard, that is, each Bchip+RG powder LED is surrounded by four BGchip+R powder LEDs, and each BGchip+R powder LED is surrounded by four Bchip+RG powder LEDs. Of course, as for other arrangements, such as one BGchip+R powder LED for every two or more Bchip+RG powder LEDs, or one Bchip+RG powder LED for every two or more BGchip+R powder LEDs, the numbers of two kinds of LEDs may or may not be equal, which will not be limited in the present invention.

Figure 4:
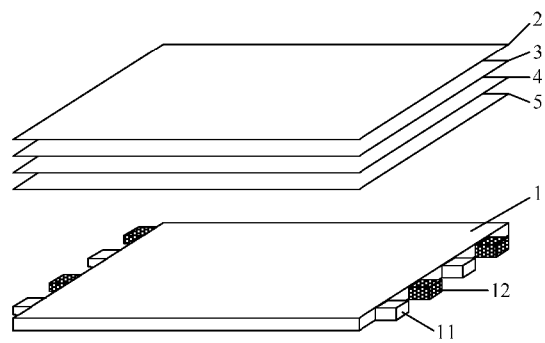
FIG. 4 is a schematic diagram of a liquid crystal display having an LED backlight source provided by embodiments of the invention.

As shown in FIG. 4, an embodiment of the present invention provides a liquid crystal display 400 including: a backlight module 402 and a display panel 408 that is for instance a fast response panel, such as a panel displaying of an IPS mode. The above-mentioned backlight module is used for the backlight module, including an LED backlight source and driving circuit modules. The LED backlight source includes Bchip+RG powder LEDs 404 and BGchip+R powder LEDs 406 that are driven by different driving circuit modules.

The reason for requiring the display panel to be a fast response panel lies in that its frame scanning frequency is required to be at least 120 per second, such that the display effect of the liquid crystal display will not be influenced adversely when Bchip+RG powder LEDs and BGchip+R powder LEDs are used alternately for the backlight source from frame to frame during the display process of the display panel.

Based on the above-mentioned liquid crystal display, the present embodiment further provides a control method for driving a backlight source used in the above-mentioned liquid crystal display, including the following process:

Only the Bchip+RG powder LEDs are turned on when the display color of the liquid crystal display is in the sRGB color gamut.

The Bchip+RG powder LEDs and BGchip+R powder LEDs are alternately turned on when the display color of the liquid crystal display is beyond the sRGB color gamut.

That is, when the color to be displayed by the liquid crystal display is in the color range that can be represented by the Bchip+RG powder LEDs, such as the color range of sRGB 100%, only Bchip+RG powder LEDs are turned on and the brightness of the liquid crystal display will not degrade.

When the colors to be displayed by the liquid crystal display is beyond the color range that can be represented by the Bchip+RG powder LEDs, such as the color range of Adobe RGB 100%, the Bchip+RG powder LEDs and the BGchip+R powder LEDs are turned on alternately. Thus, it can be ensured that under the same power consumption, while the color representation capability of the liquid crystal display reaches Adobe 100%, the brightness loss is small with respect to the liquid crystal display using only BGchip+R powder LEDs.

If only Bchip+RG powder LEDs are used, color representation capability can only meet the requirements of sRGB 100% specification. If only BGchip+R powder LEDs are used, light efficiency is low and light loss is great. By combining two kinds of LEDs, it is possible to better represent colors and in turn improve display quality without losing display brightness significantly.

Specifically, in order to facilitate driving control, the time period for turning on the Bchip+RG powder LEDs or BGchip+R powder LEDs every time is the display time period of one frame of the display panel.

Specifically, when the colors to be displayed by the liquid crystal display are beyond the color range that can be represented by Bchip+RG powder LEDs, namely the color range of sRGB 100% specification, Bchip+RG powder LEDs are turned on during odd numbered frames of the display panel and BGchip+R powder LEDs are turned on during even numbered frames; or BGchip+R powder LEDs are turned on during odd numbered frames of the display panel and Bchip+RG powder LEDs are turned on during even numbered frames. These schemes all can realize the above-mentioned effect.

With the liquid crystal display and the control method for driving a backlight source as described in the above embodiments, the color representation capability of the liquid crystal display meets requirements, while the brightness of the liquid crystal display will not be influenced adversely, with the principle explained as follows.

The following Table 2 gives the RGB chroma characteristics matching Bchip+RG powder LEDs and BGchip+R powder LEDs of an existing display panel, in which (Rx, Ry) is the chromaticity coordinate of two LEDs' red primary colors, Ry is the transmittance of two LEDs' red primary colors. For green primary color and blue primary color, their symbolic representations are similar and will not be described any more.

TABLE 2

|  | Bchip + RG powder LED | BGchip + R powder LED |
| --- | --- | --- |
| Rx | 0.640 | 0.640 |
| Ry | 0.330 | 0.330 |
| RY | 18.0% | 22.0% |
| Gx | 0.300 | 0.210 |
| Gy | 0.600 | 0.710 |
| GY | 60.0% | 62.0% |
| Bx | 0.150 | 0.150 |
| By | 0.060 | 0.060 |
| BY | 6.0% | 7.0% |

After the above-mentioned two kinds of LEDs are used alone or in combination, product properties shown in the following Table 3 will be obtained.

TABLE 3

|  | Bchip + RG powder LED | BGchip + R powder LED | Odd numbered frames (or even numbered frames): Bchip + RG powder LED; Even numbered frames (or odd numbered frames): BGchip + R powder LED |
| --- | --- | --- | --- |
| White light x | 0.314 | 0.290 | 0.306 |
| White light y | 0.330 | 0.336 | 0.332 |
| White light Y | 28.0% | 30.3% | 21.6% |
| Color temperature | 6432 | 7717 | 6869 |
| NTSC color gamut | 70.8% | 95.5% | 95.5% |
| sRGB 100% matching rate | 100.0% | 100.0% | 100.0% |
| Adobe 100% matching rate | 74.1% | 100.0% | 100.0% |
| Brightness Reduced (Calculated with the assumption that BGchip + R powder LEDs have half of light flux of Bchip + RG powder LEDs under same power consumption) | 0% (reference) | 46% | 23% |

The meaning of the first column of data corresponding to "Bchip+RG powder LED" in the table is described as follows:

According to the "Bchip+RG powder LED" provided in Table 2, the emitted white light has a chromaticity coordinate (x, y) corresponding to (0.314, 0.330), and a light flux y of 28.0%, and a color temperature of 6432, then the color representation capability of the corresponding liquid crystal display reaches NTSC 70.8%, sRGB 100.0% and Adobe 74.1% respectively. With this as a standard, the display effect of the liquid crystal display in other subsequent experiments are compared and determined. Therefore, the brightness reduction value is now noted as 0% as a reference standard and the light flux of BGchip+R powder LEDs under the same power consumption is defined as one half of Bchip+RG powder LEDs, which will not influence the judgment results.

The meaning of the second column of data corresponding to "BGchip+R powder LED" in the table is described as follows:

According to the "BGchip+R powder LED" provided in Table 2, the emitted white light has a chromaticity coordinate (x, y) corresponding to (0.290, 0.336), and a light flux y of 30.3%, and a color temperature of 7717, then color representation capability of the corresponding liquid crystal display reaches NTSC 95.5%, sRGB 100.0% and Adobe 100.0% respectively, with brightness reduced by 46%. As can be seen from this, although replacing of "Bchip+RG powder LEDs" with "BGchip+R powder LEDs" can improve color representation capability of the liquid crystal display, however the brightness of the liquid crystal display is reduced significantly, severely influencing the display quality of the liquid crystal display.

The meaning of the third column of data in the above table is described as follows:

According to the "Bchip+RG powder LEDs" and "BGchip+R powder LEDs" provided in Table 2, the two kinds of LEDs are turned on alternately during odd numbered frames and even numbered frames of the liquid crystal display, with the emitted white light having a chromaticity coordinate (x, y) corresponding to (0.306, 0.332), a light flux y of 21.6%, a color temperature of 6869. Now the color representation capability of the corresponding liquid crystal display reaches NTSC 95.5%, sRGB 100.0% and Adobe 100.0% respectively with brightness reduced by 23%. As can be seen from this, combing "BGchip+R powder LEDs" and "Bchip+RG powder LEDs" and driving them to turn on alternately can realize a color representation capability up to Adobe 100.0% of the liquid crystal display and the brightness of the liquid crystal display will not decrease significantly, hence not causing poor display of the liquid crystal display.

As can be seen from above, under the same power consumption:

Compared with the brightness of the liquid crystal display commonly using Bchip+RG powder LEDs, the brightness of liquid crystal displays using only GBchip+R powder LEDs for corresponding to Adobe 100% is reduced by 46%;

Compared with the brightness of common liquid crystal displays using Bchip+RG powder LEDs, the brightness of the above-mentioned liquid crystal displays using the scheme of turning on Bchip+RG powder LEDs in odd numbered frames (or even numbered frames) and turning on GBchip+R powder LEDs in even numbered frames (or odd numbered framed) to correspond to Adobe 100% is reduce by 23%.

Therefore, the liquid crystal display which uses the scheme of turning on Bchip+RG powder LEDs in odd numbered frames (or even numbered frames) and turning on GBchip+R powder LEDs in even numbered framed (or odd numbered frames) to correspond to Adobe 100%, compared with the liquid crystal display using only GBchip+R powder LEDs to correspond to Adobe 100%, has brightness loss which is reduced to the half of the latter and realizes improvement of product performance while realizing Adobe 100%. That is, advantages of "BGchip+R powder LEDs" and "Bchip+RG powder LEDs" are combined, which improves the color representation capability of the liquid crystal display while the brightness will not be degraded significantly to influence the display quality of the liquid crystal display.

As can be seen from the above embodiments, in embodiments of the present invention, by combining Bchip+RG powder LEDs and BGchip+R powder LEDs for the backlight source of a liquid crystal display and controlling the driving of the two LEDs with different driving circuit modules, when the colors to be displayed by the liquid crystal display is in the color range that can be represented by the Bchip+RG powder LEDs, only Bchip+RG powder LEDs are turned on; when the colors to be represented by the liquid crystal display is beyond the color range that can be represented by the Bchip+RG powder LEDs, Bchip+RG powder LEDs and BGchip+R powder LEDs are turned on alternately during odd numbered frames and even numbered frames of the display panel. Therefore, it is realized that under the same power consumption, the color representation capability of the liquid crystal display meets requirement and the overall brightness of the liquid crystal display will not be influenced adversely.

What have been described above are only exemplary implementations of the present invention, It should be noted that for those of ordinary skill in the art, a number of improvements and substitutions may be made without departing from the technical principle of the present invention, and these improvements and substitutions should also be regarded as the protection scope of the present invention.

The invention claimed is:

1. A backlight module comprising an LED backlight source and a driving circuit, the LED backlight source comprising first LEDs each formed of a blue light chip, red phosphor powder and green phosphor powder, and second LEDs each formed of a blue light chip, a green light chip and red phosphor powder, and the driving circuit comprising driving circuit modules for driving the first LEDs and the second LEDs respectively, wherein, the driving circuit modules turn on only the first LEDs when display colors of a liquid crystal display is in sRGB 100% color gamut; and alternately turn on the first LEDs and the second LEDs when display colors of the liquid crystal display is beyond sRGB 100% color gamut, wherein the backlight module further comprises a light-guiding plate, the first LEDs and the second LEDs being arranged alternatively in lines on a light incidence side of the light-guiding plate.

2. A liquid crystal display comprising a backlight module and a display panel wherein the backlight module comprises an LED backlight source and a driving circuit, the LED backlight source comprising first LEDs each formed of a blue light chip, red phosphor powder and green phosphor powder, and second LEDs each formed of a blue light chip, a green light chip and red phosphor powder, and the driving circuit comprising driving circuit modules for driving the first LEDs and the second LEDs respectively, wherein, the driving circuit modules turn on only the first LEDs when display colors of the liquid crystal display is in sRGB 100% color gamut; and alternately turn on the first LEDs and the second LEDs when display colors of the liquid crystal display is beyond sRGB 100% color gamut, wherein the backlight module further comprises a light-guiding plate, the first LEDs and the second LEDs being arranged alternatively in lines on a light incidence side of the light-guiding plate.

3. The liquid crystal display of claim 2, wherein a frame scanning frequency of the display panel is at least 120 scans per second.

4. A control method for driving a backlight source comprising first LEDs each formed of a blue light chip, red phosphor powder and green phosphor powder, and second LEDs each formed of a blue light chip, a green light chip and red phosphor powder, the method comprising the following process:

turning on only the first LEDs when display colors of a liquid crystal display is in sRGB 100% color gamut; and alternately turning on the first LEDs and the second LEDs when display colors of the liquid crystal display is beyond sRGB 100% color gamut, wherein the first LEDs and the second LEDs are arranged alternatively in lines on a light incidence side of a light-guiding plate.

5. The method of claim 4, wherein the first LEDs and the second LEDs are alternately turned on when the display color of the liquid crystal display is beyond sRGB 100% color gamut, and a time period for turning on the first LEDs or the second LEDs every time is a time period for the display panel to display one frame.

6. The method of claim 5, wherein when the display colors of the liquid crystal display are beyond sRGB 100% color gamut, the first LEDs are turned on during the display panel displays odd numbered frames, and the second LEDs are turned on during the display panel displays even numbered frames.

7. The method of claim 5, wherein when the display colors of the liquid crystal display are beyond sRGB 100% color gamut, the second LEDs are turned on during the display panel displays odd numbered frames, and the first LEDs are turned on during the display panel displays even numbered frames.

8. The method of claim 4, wherein a frame scanning frequency of the display panel is at least 120 scans per second.

* * * * *